3,278,479
CLAY COATED WITH ETHOXYLATED AMIDE
AND POLYESTER RESINS CONTAINING
THE SAME
Thomas H. Ferrigno, Metuchen, N.J., assignor to Minerals & Chemicals Philipp Corporation, Menlo Park, N.J., a corporation of Maryland
No Drawing. Filed Mar. 16, 1962, Ser. No. 180,320
8 Claims. (Cl. 260—40)

The subject invention relates to kaolin clay which is coated with an ethoxylated amide and relates also to improved polyester resin compositions formulated with the novel coated clay.

Kaolin clay, in its naturally occurring hydrophilic state, is used as a mineral filler in the production of thermoset plastics from liquid unsaturated polyester resins. The clay is mixed with a liquid polymerizable unsaturated polyester resin and the mixture, together with a peroxide catalyst and frequently auxiliary ingredients, is cured to crosslink the polyester into a thermoset plastic product. Usually glass fibers are included in the composition as a reinforcing agent. In the case of polyester premixes (frequently called "doughs" or "gunks"), the glass fibers are uniformly mixed with the liquid polyester and filler and the thick mass is molded. In carrying out the so-called "preform" method, a mixture of polyester and filler is impregnated on a mat of glass fibers and the impregnated glass is molded to produce a thermoset glass fiber laminate. The clay is used principally as a bulking agent and also to minimize shrinkage of the resin during curing. The clay is not used, however, to improve the strength of the thermoset resin and, in fact, the use of naturally occurring clay in large quantities usually appreciably reduces the tensile and flexural strength of the plastic product.

Furthermore, the clay, being hydrophilic in nature, is not readily wet by the liquid polyester resin and it is difficult to disperse the clay in the liquid resin. When used in appreciable quantity, the clay increases the viscosity of the liquid polyester to a considerable degree and produces a marked thixotropic effect. In some instances, the resultant thickening effect is desirable and for certain vertical molding layups and coating applications, thixotropy in polyester resins is highly desirable. However, in many other instances a marked thickening effect of the clay on the polyester resin is very undesirable inasmuch as it limits significantly the quantity of clay filler which can be incorporated into the polyester while providing a mixture of moldable consistency.

It has been suggested to coat clay with various organic compounds to improve the dispersibility of the clay in liquid organic media, such as, for example, unsaturated polyester resins. Certain aliphatic amines and amine salts have been found to be very effective in promoting the dispersion of the clay in liquid polyester resins. However, when the clay coated with amine is incorporated into organic media it produces an undesirable thickening effect due to reactivity of the amine with the polyester. Moreover, this type of coating contributes substantially little, if anything, to the strength of a clay-filled molded polyester resin.

A principal object of my invention is the provision of a novel organic coated kaolin clay having organophilic properties. A more particular object is to provide a finely divided kaolin clay product especially useful as a reinforcing filler in a thermoset resin prepared from a liquid unsaturated polyester resin. Another object is to provide a finely divided coated kaolin clay product which can be dispersed readily in liquid unsaturated polyester resins in appreciable quantities without significantly increasing the viscosity of the resin. Still another object of my invention is the provision of organic coated kaolin clay which, when used as a filler in plastics made from liquid unsaturated polyester resins, results in a composition having greater flexural strength than plastics made with the uncoated clay as a filler. A further object of my invention is the provision of improved molding compositions containing liquid polymerizable unsaturated polyester resins.

Further objects and features of the invention will be apparent from the description thereof which follows.

I have discovered that the usefulness of kaolin clay as a filler in plastics prepared from liquid polymerizable unsaturated polyester resins can be improved by coating particles of the clay, prior to incorporating the clay into the liquid resin, with a particular type of nonionic surface active agent described hereinafter.

Briefly stated, the novel filler of this invention consists of kaolin clay, the particles of which are uniformly coated with a small amount of a water-soluble or water-dispersible amide having as substituents a single alkyl group and two polyoxyethylene groups, said amide being represented by the following structural formula:

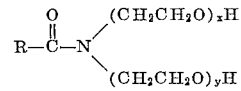

wherein R is selected from the group consisting of alkyl and alkenyl groups having from 8 to 22 carbon atoms, and $x$ and $y$ are each integers totalling between 2 and 50.

The N,N-polyoxyethylene substituted fatty acid amide coated kaolin clay product, described above, is useful as a filler in the formulation of molded plastics from polymerizable liquid unsaturated polyesters by both the premix and preform methods and is also useful as a pigment in polyester gel coats. In these various types of molding compositions, the coated clay product can be dispersed more readily in the liquid polyester vehicle than the normally hydrophilic naturally occurring clay and the viscosity of unsaturated liquid poleyster compositions containing coated clays of this invention is usually less than or about the same as the viscosity of the liquid polyester containing the same quantity of uncoated clay of the same particle size. The viscosity will vary with the quantity of coating agent used and with the particle size of the clay. In the case of gel coats, the thermoset resin filled with the coated calcined clay of this invention has appreciably higher flexural strength than a like resin filled with the same quantity of naturally occurring clay of the same or finer particle size. In preform laminates, the use of the coated clay results in a laminate having higher flexural strength than a laminate prepared with uncoated clay without embrittling the resin.

As mentioned above, the amides that are employed as a clay coating agent contain a single alkyl (or alkenyl) group and two polyoxyethylene groups. Especially preferred are substituted fatty amides contained by ammoniating and amidifying oils of vegetable and animal origin and condensing the amides with ethylene oxide. These amides contain one or, more usually, a mixture of n-aliphatic hydrocarbon groups, saturated and/or unsaturated, containing 12 to 18 carbon atoms. As examples of preferred ethoxylated amides may be mentioned N,N-polyethoxylated hydrogenated tallow amide, N,N-polyethoxylated oleyl amide, N,N-polyethoxylated amides from coconut fatty acids or soybean oil fatty acids.

The clay that is employed in carrying out this invention is kaolin clay, by which is meant a clay whose predominating mineral specie is kaolinite, anauxite, dickite or nacrite. These minerals are all hydrous aluminum silicates of the empirical formula $Al_2O_3 \cdot 2SiO_2 \cdot 2H_2O$. Kaolin clay, as mined, consists of fine particles together with coarse agglomerates and grit (principally quartz). It is the usual practice of clay processors to remove from the clay coarse agglomerates and gritty matter. For some commercial uses, kaolin clay is fractionated, as by hydraulic or air sedimentation methods, to obtain a fraction of clay having the desired particle size. Usually the clay is fractionated to obtain a very fine particle size fraction which is particularly useful as an ingredient of paper coating compositions. This leaves a coarse fraction, the particle size distribution of which will depend on the amount of fines removed from the whole clay during the fractionation. In carrying out my invention, I prefer to use a coarse size fraction of clay which has an average equivalent spherical diameter within the range of from about 4 to 15 microns and is free from grit and particles larger than about 55 microns. Whole clay (which usually has an average equivalent spherical diameter of about 1.5 microns) and fine fractions of whole clay can also be used. All micron particle sizes, as used herein, are expressed as equivalent spherical diameters and are obtained by the well-known Andreasen method (a water sedimentation method) assigning 2.58 as the value of particle density. The term "average equivalent spherical diameter" refers to the particle size of a material which is so chosen that 50 percent by weight of the particles will be finer than that value.

It is also within the scope of this invention to employ a kaolin clay which has been calcined prior to the incorporation of N,N-polyoxyethylene substituted fatty acid amide coating agent therewith. The coated calcined clay is especially useful as a pigment in polyester gels where it may replace all or a portion of the more expensive titania pigment with good results. Calcined kaolin clay pigments are obtained by heating kaolin clay at a temperature within the range of about 1650° F. to about 1800° F. for a time sufficient to dehydrate the clay substantially completely.

In putting this invention into practice, I uniformly coat the clay particles with a very small quantity of N,N-polyoxyethylene substituted fatty acid amide. Various methods are suitable for the purpose. The simplest procedure involves dry milling the clay with an appropriate quantity of substituted amide. Inasmuch as the effectiveness of the amide coating depends on its uniform distribution on the surface of the clay particles, the coating material is preferably applied in the form of a solution or dispersion, such as a solution or dispersion in water, after which the solvent is removed from the clay and amide, as by drying, and the aggregates of coated clay pulverized to particles substantially all of which are minus 44 microns.

The quantity of N,N-polyethylene oxide substituted amide coating employed is within the limits of about ½ to 5 percent of the dry clay weight. The optimum quantity of coating agent used may vary somewhat with the particle size of the clay and is usually within the range of about 1½ to 2½ percent of the clay weight. While increments in the quantity of coating agent generally result in clay filled unsaturated polyester systems of lower viscosity, the amount of coating agent employed is limited by the fact that the use of excessive coating agent reduces the strength of the molded polyester resin which is formulated with the coated clay.

The liquid unsaturated polyester resins employed in producing improved molding compositions of this invention are obtained by reacting a dihydric alcohol and a dibasic acid, either of which contains a pair of double-bonded carbon atoms. The unsaturated long chain polyester molecule is essentially linear and is capable of being crosslinked to form a thermosetting resinous solid through the double bonds in the ester. A liquid unsaturated monomer, such as styrene, is employed as a crosslinking solvent, and an organic peroxide is usually employed to catalyze the crosslinking reaction. The thermoset product consists of a long chain ester linked into a three-dimensional resin with carbon-to-carbon crosslinks. The unsaturated polyesters are characterized by thermosetting without evolution of water. Commercial unsaturated polyester resins usually contain a mixture of unsaturated polyesters and unsaturated monomeric solvent.

Polyols used in the preparation of commercial polyesters include: ethylene glycol; propylene glycol; 1:3-butylene, 2:3-butylene and 1:4-butylene glycols; diethylene glycol and triethylene glycol.

Maleic anhydride and fumaric acid are the unsaturated acids most frequently used in the preparation of unsaturated polyesters; maleic acid is used to a lesser extent. Other suitable unsaturated acids are citraconic acid, itaconic acid and 3:6-endomethylene tetrahydrophthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances, trihydric alcohols, such as glycerine or castor oil, or higher alcohols, such as pentaerythritol or sorbitol, are used to modify the product.

Styrene, diallylphthalate and triallyl cyanurate are the principal crosslinking monomeric agents.

As mentioned, the crosslinking reaction is catalyzed with a peroxide catalyst, usually benzoyl peroxide. Other catalysts are methylethylketone peroxide and methylisobutyl ketone peroxide.

Accelerators, stabilizers, promoters and coloring agents may be incorporated in the polyester when desired, as well as auxiliary fillers such as fibrous asbestos, calcium carbonates, etc.

In the preparation of moldable polyesters mixes employing the novel coated kaolin, the clay is added to the unsaturated liquid polyester resin in the same manner and with equipment usually employed for adding clay or other fillers to the resin.

The quantity of coated clay I prefer to employ is from 10 to 200 percent, based on the weight of the liquid unsaturated polyester (inclusive of the polymerizable monomer, such as styrene). In the preparation of gunk molding mixtures containing glass fibers I prefer to employ about 50 to 150 parts of coated clay to 100 parts by weight of liquid polyester. In some instances, the quantity of glass fibers may be reduced from that normally employed in premixes when my coated clay is used. A suggested proportion of glass fibers is from 10 to 30 parts per 100 parts of polyester. In laminating mixes, I prefer to use from about 20 to 100 parts by weight of coated clay to 100 parts by weight of polyester.

After the coated clay is dispersed in the liquid polymerizable unsaturated resin and catalyst added, the mixture is placed in a suitable mold and cured in a manner applicable to the particular polyester resin employed.

My invention is illustrated in further detail by the following examples in which all proportions of ingredients are in parts by weight unless otherwise specified.

EXAMPLE I

This example illustrates the use of the coated clay of this invention as a filler for a preform polyester laminate.

A coarse size fraction of degritted uncalcined Georgia kaolin clay (average equivalent spherical diameter of 4.8 microns) was coated with 1 percent by weight of N,N-polyethylene oxide substituted hydrogenated tallow amide containing a total of 50 mols of ethylene oxide per mol of amide (Ethomid HT/60). The bone dry clay was placed in a mixing vessel and a 10 percent aqueous solution of amide was slowly added to the clay with agitation. Mixing was at room temperature. The materials were rapidly agitated for 10 minutes after all of the amide solution had been added and the wet sample held in a forced draft oven at 180° F. for 1¼ hours for drying. The dried clay was placed in a high speed hammer mill while it was still warm and the material, after cooling, was placed in a sealed glass jar.

(1a) In preparing clay-filled laminates, 30 parts by weight of clay (coated or uncoated) was initially thoroughly dispersed in 70 parts by weight of an isophthalic acid modified liquid unsaturated polyester resin containing 20 percent styrene monomer. Benzoyl peroxide was added in amount of 1 percent by weight of the resin. The mixture was poured on a glass mat (two layers of chopped strand 2 oz. mat placed in a 12" x 12" mold with 30 mil polysilane treated surfacing mat on top). The laminates were made up to maintain the glass fiber content within the limits of 111 to 113 gm. glass/sq. ft. Laminates were cured for 5 minutes at 250° F. with the pressure maintained at 700 p.s.i. The results are tabulated in Table I.

TABLE I

EFFECT OF PRECOATING KAOLIN CLAY FILLER WITH N,N-POLYETHYLENE OXIDE SUBSTITUTED FATTY ACID ON PROPERTIES OF PREFORM LAMINATES (30% FILLER, 70% RESIN)

| Kaolin Clay Filler | Flexural Strength, p.s.i. (A.S.T.M.: D790–58T) | Flexural Modulus, p.s.i.×10$^6$ |
|---|---|---|
| Uncoated | 21,350 | 1.10 |
| Coated with 1% Ethomid HT/60 | 30,740 | 0.96 |

Strength data in Table I for kaolin filled preform polyester laminates show precoating the clay filler with N,N-polyethylene oxide substituted fatty acid amide effected a substantial improvement in flexural strength of the clay-filled laminate. The modulus of the laminate containing amide coated clay was similar to the modulus of the laminate containing uncoated clay, indicating that the improvement in flexural strength had not been achieved by embrittling the resin.

(1b) To illustrate that kaolin clay which has been coated with a N,N-polyethylene oxide substituted amide, in accordance with this invention, is readily dispersible in a liquid polyester laminating resin and that the dispersion of the coated clay has desirable viscosity properties, the rheology of an unsaturated liquid polyester resin containing the coated uncalcined coated clay of Example I (1a) was compared with the rheology of the polyester containing the same quantity of the uncoated 4.8 micron clay. The unsaturated polyester employed in the test was a low reactivity polyester prepared by esterification of ethylene glycol with fumaric acid and containing 40 percent styrene monomer (Polylite 8007). The results are tabulated in Table II.

TABLE II

THE EFFECT OF COATING UNCALCINED KAOLIN CLAY WITH N,N-POLYETHYLENE OXIDE SUBSTITUTED HYDROGENATED TALLOW AMIDE ON THE VISCOSITY OF SUSPENSIONS IN AN UNSATURATED POLYESTER RESIN [1]

| Clay Filler Average Equivalent Spherical Diameter | Clay Coating | Brookfield Viscosity [2] (poises), Initial | |
|---|---|---|---|
| | | 5 r.p.m. | 100 r.p.m. |
| 4.8 microns | No coating | 6.80 | 1.33 |
| 4.8 microns | 1% Ethomid HT/60 | 6.40 | 1.15 |

[1] 30 parts clay/70 parts resin.
[2] Mixes made up, vacuum degassed and aged overnight before testing The results reported in Table II show that the viscosity of the liquid polyester resin containing the coated clays of this invention, was somewhat less than the viscosity of the resin containing the same particle size uncoated clay, at both high and low rates of shear. The data show that a highly desirable thixotropic level was obtained with the coated clay, a property especially suitable in laminating resin mixes.

The coated kaolin filler was more readily dispersed in the liquid resin than the uncoated clays.

EXAMPLE II

This example illustrates the advantages of coating a calcined kaolin pigment for a polyester gel coat with a N,N-polyethylene oxide substituted fatty acid amide. A sample of a commercial calcined kaolin pigment having an average equivalent spherical diameter of 1.5 microns was coated with 1 percent by weight of N,N-polyethylene oxide substituted hydrogenated tallow amide containing a total of 15 mols of ethylene oxide per mol of amide (Ethomid HT/25). The bone dry clay was placed in a mixing vessel. To the clay there was added slowly with agitation a 10 percent aqueous solution of amide. Mixing was at room temperature. The materials were rapidly agitated for 10 minutes after all of the amide solution had been added and the wet sample held in a forced draft oven at 160° F. for 1¼ hours for drying. After drying, the sample was placed in a high speed screen mill while it was still warm and the sample, after cooling, was placed in a sealed glass jar.

In producing clay pigmented polyester gel coats, 30 parts by weight of the clay pigment was mixed into 70 parts by weight of a commercial room temperature curing unsaturated liquid polyester resin containing 20 percent styrene and cobalt activator. The resin, especially prepared for gel coat use, is essentially the same as the resin employed in Example I (1b) but contained a wax to prevent inhibition of polymerization by air contacting the exposed surface of the resin. The ingredients were mixed thoroughly with a high speed agitator and then catalyzed with 1 percent methylketone peroxide (based on the weight of the resin). The mix was then placed in a ⅛-inch plate glass mold, cured at room temperature and then post-cured at 250° F. for one hour to obtain data indicative of the performance of the aged, cured resin during use.

Viscometric evaluations of the unfilled and filled resin compositions are given in Table III. Strength properties of the same compositions after molding are given in Table IV.

TABLE III

PROPERTIES OF POLYESTER GEL COAT RESINS FORMULATED WITH CALCINED KAOLIN CLAY PIGMENT

| Pigment | Brookfield Viscosity, poises | | | |
|---|---|---|---|---|
| | Initial, r.p.m. | | After 8 Days, r.p.m. | |
| | ½ | 100 | ½ | 100 |
| Calcined kaolin | 8.00 | 5.23 | 6.00 | 4.84 |
| Calcined kaolin coated with 1% Ethomid HT/25 | 4.00 | 4.05 | 4.00 | 4.17 |

Data in Table III for viscometric properties of resin mixes indicate that systems containing calcined kaolin coated with ethoxylated amide are less viscous at all shear rates than systems containing uncoated calcined clay and that the flow properties of the resin containing the coated clay approximate the almost Newtonian flow properties of the resin. To impart the desired thixotropy to the calcined pigment system for gel coat use, a small amount of colloidal silica (normally employed with titania pigment) can be incorporated into the resin in the usual manner.

Table IV
PROPERTIES OF POLYESTER GEL COATS CONTAINING 30% CALCINED KAOLIN CLAY PIGMENT

| Pigment | Flexural Strength, p.s.i. ×10³ | |
|---|---|---|
| | Room Temperature Cured Casting—A.S.T.M.: D790-58T | Casting Post-cured at 250° F./1 hr.—D790-58T |
| None | 7.14 | 10.30 |
| Calcined kaolin | 8.15 | 9.15 |
| Calcined kaolin coated with 1% Ethomid HT/25 | 7.95 | 9.78 |

Data in Table IV show the improvement in flexural strength of the post-cured calcined kaolin pigmented gel coat obtained by precoating the calcined kaolin pigment with 1 percent of a N,N-polyethylene oxide substituted fatty acid amide, in accordance with this invention.

I claim:

1. Kaolin clay, the particles of which are uniformly coated with from about ½ to 5 percent by weight of a water-dispersible amide of the following formula:

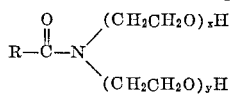

wherein R is selected from the group consisting of alkyl and alkenyl, said group being derived from a fatty acid and containing from 8 to 22 carbon atoms, and $x$ and $y$ are integers totalling between 15 and 50.

2. The product of claim 1 wherein said kaolin clay had been heated at a temperature within the range of about 1650° F. to about 1800° F. for a time sufficient to dehydrate said clay substantially completely prior to having been coated with said amide.

3. Kaolin clay having an average equivalent spherical diameter within the range of about ½ to 5 microns, said clay being uniformly coated with from about ½ to 5 percent by weight of an amide of the following structural formula:

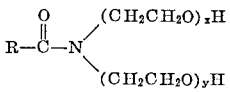

wherein R is selected from the group consisting of alkyl and alkenyl, said group being derived from a fatty acid and containing from 8 to 22 carbon atoms, and $x$ and $y$ are integers totalling between 15 and 50.

4. Kaolin clay having an average equivalent spherical diameter of about 5 microns, said clay being uniformly coated with from about 1½ to about 15½ percent by weight of a water-dispersible amide of the following structural formula:

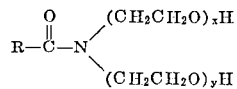

wherein R is selected from the group consisting of alkyl and alkenyl, said group being derived from a fatty acid and containing from 8 to 22 carbon atoms, and $x$ and $y$ are integers totalling between 15 and 50.

5. Kaolin clay, the particles of which are uniformly coated with from about ½ to 5 percent by weight of an N,N-polyethylene oxide substituted hydrogenated tallow amide containing a total of from 15 to 50 mols of ethylene oxide per mol of amide.

6. A laminating resin mixture comprising from about 20 to 100 parts by weight of the product of claim 1 and about 100 parts by weight of a liquid solution in an ethylenically unsaturated monomer of a polymerizable unsaturated polyester resin which consists essentially of the reaction product of a saturated polyhydric alcohol and at least one unsaturated dibasic acid.

7. A molding mixture comprising 100 parts by weight of a liquid solution in an ethylenically unsaturated monomer of a polymerizable unsaturated polyester resin which consists essentially of the reaction product of a saturated polyhydric alcohol and at least one unsaturated dibasic acid, 50 to 150 parts by weight of the composition of claim 1, and from 10 to 30 parts by weight of glass fiber.

8. A gel coat resin composition comprising a mixture of a liquid solution in an ethylenically unsaturated monomer of a polymerizable unsaturated polyester resin which consists essentially of the reaction product of a saturated polyhydric alcohol and at least one unsaturated dibasic acid and a pigment-forming proportion of the composition of claim 2.

References Cited by the Examiner

UNITED STATES PATENTS

| | | | |
|---|---|---|---|
| 2,085,706 | 6/1937 | Schoeller et al. | 260—404 |
| 2,746,897 | 5/1956 | Roder et al. | 260—404 XR |
| 2,948,632 | 8/1960 | Albert et al. | 260—40 XR |
| 2,975,147 | 3/1961 | Abbott et al. | 260—40 XR |
| 3,014,836 | 12/1961 | Proctor | 106—72 |
| 3,032,431 | 5/1962 | Ferrigno | 260—40 XR |
| 3,094,499 | 6/1963 | Gassmann et al. | 106—308 |

MORRIS LIEBMAN, *Primary Examiner.*

MILTON STERMAN, *Examiner.*

A. KOECKERT, *Assistant Examiner.*

UNITED STATES PATENT OFFICE
CERTIFICATE OF CORRECTION

Patent No. 3,278,479                                        October 11, 1966

Thomas H. Ferrigno

It is hereby certified that error appears in the above numbered patent requiring correction and that the said Letters Patent should read as corrected below.

Column 3, line 18, for "55 microns" read -- 44 microns --; column 8, line 1, for "15-1/2" read -- 2-1/2 --.

Signed and sealed this 5th day of September 1967.

(SEAL)
Attest:

ERNEST W. SWIDER                                  EDWARD J. BRENNER
Attesting Officer                                     Commissioner of Patents